Aug. 6, 1929.  J. W. REID  1,723,372
PROCESS OF SEPARATING LIGNITE FROM SAND AND GRAVEL
Filed Nov. 23, 1921
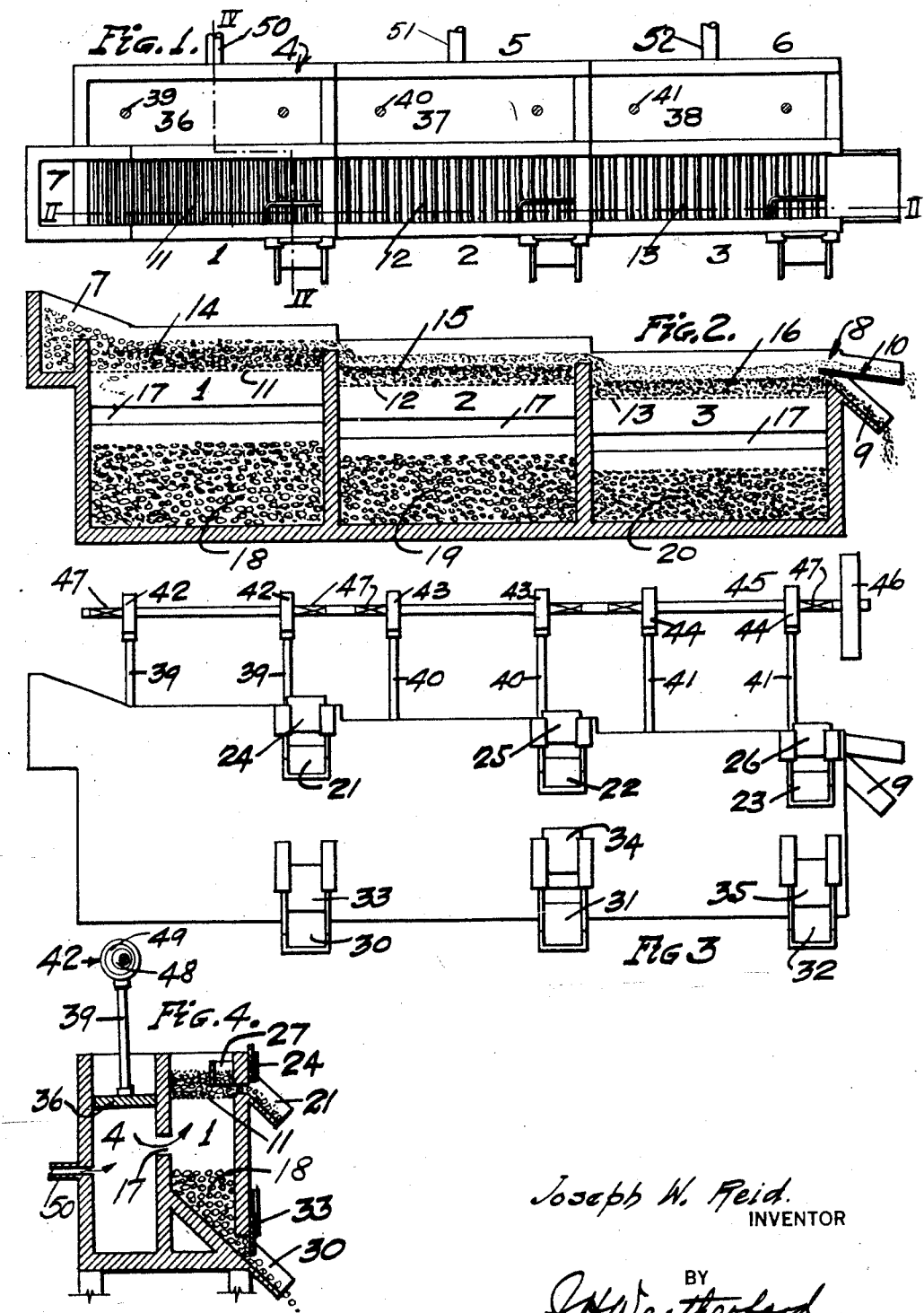
Joseph W. Reid.
INVENTOR
BY
J. H. Weatherford
ATTORNEY Patented Aug. 6, 1929.

1,723,372

UNITED STATES PATENT OFFICE.

JOSEPH W. REID, OF MEMPHIS, TENNESSEE.

PROCESS OF SEPARATING LIGNITE FROM SAND AND GRAVEL.

Application filed November 23, 1921. Serial No. 517,189.

My invention relates to improvements in the method of separating lignite and other impurities from sand and gravel, which are comparatively much heavier. The material on which this process is especially designed to be used is that which is dug from the bed of streams, ordinarily by hydraulic process, and which in many cases carries such proportions of lignite and other impurities as to render it unfit for use. These latter materials are of sufficiently less specific gravity than sand and gravel to permit them to be removed therefrom by a washing operation in which advantage is taken of the inherent difference in their specific gravity.

The principal object of the present invention is to provide a novel process for separating a relatively light material, such as lignite, from two heavier materials, such as sand and gravel, while at the same time separating the finer of said two heavier materials, and the finer portions of the other one thereof, from the coarser portions of the latter. And a further object is to afford a process which will effect such initial separations more rapidly and satisfactorily, and at less expense per unit of volume or weight of the materials treated, than would be possible with any separation process known heretofore.

The separation of materials such as those referred to above, for which my improved process is particularly adapted, involves conditions very different from those encountered in other related separation operations, such as the removal of slate from coal, or the separation of an ore from the rock in which it occurs. For example, in wash separation of slate from coal, the much heavier slate is the material that is wasted away, while the coal, the specific gravity of which does not differ greatly from that of water, is the material that is recovered; in the separation of ore from rock by jig-washing, both materials are of much greater specific gravity than water, and it is the lighter of the two materials (the rock) that is intended to be wasted away, and the heavier (the ore) that is to be recovered; but lignite, which is the principal material the removal and wasting away of which is intended to be accomplished by my present invention, has a specific gravity that does not differ greatly from that of water, while both sand and gravel (the materials to be recovered) are very much heavier than water, so that it readily is feasible to perform the desired separation with water that is applied to the three materials, as initially combined, under such head, and in such volume, as not only to remove the lightest, or waste, material upward away from the heavier ones, but also further to affect the separation by propelling said waste material laterally away from the other two with sufficient rapidity to add very materially to the capacity rate at which this separation is effected. Also, it should be noted that in the intended application of my process, there are three principal materials to be dealt with, which differ greatly from each other in their physical characteristics, but there is only one of these three (the lignite) that is to be completely separated from the others, the separation of the sand and gravel from each other not being intended, in my process, to accomplish complete segregation of said materials, but merely to separate the coarser particles of the gravel from the remainder of the heavier materials, comprising a mixture of the sand and the finer particles of the gravel.

Furthermore, since the lignite to be separated out and wasted away is of little or no value, and the sand and gravel from which it is to be removed are low-priced products, it is an extremely important requirement, in connection with the method employed for the purpose for which my present invention is intended, that the capacity rate of satisfactory operation shall be as great as possible, in proportion to the apparatus used and the expense of operation. This requirement is of such great importance that, in order to meet it satisfactorily, my process does not contemplate separation of the finer particles of the gravel from the sand, which would necessitate either the use, in the first one or more of the cells, of gratings or screens of such fine mesh that only the sand would pass therethrough, or limitation of the amount and speed of the wash water, sufficiently to effect stratification of the initially-mixed materials during the washing operation. Either of these provisions for completely separating the sand from the gravel would greatly decrease the capacity rate of wash separation, and, in order to avoid this, I prefer to effect the final separation of the finer particles of the gravel (commonly called "torpedo") from the sand by subsequent screening by any of the well-known methods.

In the accompanying drawings, which depict one form and arrangement of apparatus that I have found in commercial practice to be well adapted for carrying on my process,—

Figure 1 is a plan view of the apparatus with the operating shaft of the pumps not shown and without materials in place. Figure 2 is a section through the material cells of the separator taken on the line II—II of Fig. 1, and showing the various beds of material. Figure 3 is a side elevation of the separator. Figure 4 is a section on the line IV—IV of Figure 1.

Referring now to the drawings, in which the various parts are indicated by numerals, 1, 2 and 3 are material cells, 4, 5 and 6 are corresponding pump chambers, 7 is a receiving hopper into which the material to be treated is first fed, and 8 is an overflow from the material cell 3, which overflow consists of a main channel 9, separated into a lower and upper portion by dividing plate 10. It will be especially noted that the three cells or chambers may in some cases be reduced in number to two, or if necessary one or more may be added. These cells are adjacent and are at successively lower levels,—that is, the cell 2 is lower than cell 1, so that the material from the surface of cell 1 can overflow into cell 2. In each of these cells 1, 2 and 3 there is a grating, 11, 12 and 13, respectively, which may be, as is shown, a series of parallel bars preferably situated transversely of the cell, or, if desired, may be of some form of mesh screen. These gratings are placed near the upper portion of each of the said cells, and on top of these gratings beds of material 14, 15 and 16 respectively, are formed. Within each cell is a channel 17 which leads from the pump chamber to its corresponding separating chamber, this channel being entirely below the bed of the material 14, 15, etc. In the lower portion of the cells 1, 2 and 3, etc., are storage spaces 18, 19 and 20, respectively. 21, 22 and 23 are overflow channels leading, respectively, from the upper beds 14, 15 and 16, the openings to which channels may be regulated by slides 24, 25 and 26, respectively. 27, 28 and 29 are guards around these openings, extended above the ordinary level of the bed of material to prevent a sudden drawing down of the bed around the mouth of the opening. 30, 31 and 32 are channels leading from the storage spaces, 18, 19 and 20, respectively, the discharge through which is regulated by corresponding slides or gates 33, 34 and 35. In Figure 3 the gate 34 is shown raised entirely clear of the channel or opening 31, whereas the gates 33 and 35 in this view and in the section of Fig. 4 are shown down, to reduce the sizes of the openings.

In each of the pump chambers 4, 5 and 6 a plunger 36, 37 and 38, respectively, is shown. These plungers are each connected by a pair of connecting rods 39, 39, 40, 40, 41, 41, to corresponding eccentrics 42, 42, 43, 43, 44, 44, on a common shaft 45, which may be driven by a belt pulley 46, connected through a belt, not shown, to any suitable source of power. Suitable bearings should be provided at 47 to support this shaft. Each of these eccentrics, as 42, shown in Fig. 4, consists of an eccentrically-mounted disc 48, rigidly fastened to the shaft, and a ring or strap 49, which may be shifted around the disc 48 to vary the stroke of the plungers. The relative locations of these two parts of the eccentric as shown in Fig. 4 gives the maximum stroke, whereas if the member 49 should be shifted 180 degrees relatively to the member 48 it would give the minimum stroke, and any intermediate length of stroke can be secured by properly shifting the relative position of the two within such range, and suitably locking them in such position. The detail of this locking device is not shown, since it is well known.

The action of the separator is as follows: A continuous stream of the combined materials is allowed to be carried into the hopper 7 by a stream of water from some form of charging device (not shown). The water thus supplied serves not only to prevent undue stoppage and piling up of the materials in the hopper 7, but also to increase the volume of water that flows over the beds 14, 15 and 16, such flow being at a rate that is increased by the step-down arrangement of the grates 11, 12 and 13. From the charging hopper 7 the materials and water overflow upon the grating 11 in the first cell 1, the shaft 45 meanwhile being rotated, and the pump chambers 4, 5 and 6 having been filled with water through pipes 50, 51, and 52, the reciprocation of the plungers 36, 37, 38 forces a body of water through channel 17 and upward through gratings 11, 12 and 13, respectively, and spreads the combined materials introduced through hopper 7 into practically a level bed first across the grating in cell 1, thence spreading the overflow materials upon grating 12 of cell 2, and thence in a bed across the grating 13 in cell 3. After a substantially horizontal bed has been made in each of these cells the true process of separation starts.

Continued oscillation of the pump plungers alternately forces a body of water upward through one of the beds of materials mentioned, then allows the water to drop suddenly, carrying some of the materials with it to the gratings. This sudden raising and lowering of the combined materials forces the lignite to the top and allows the sand and gravel to drop to the bottom. A considerable percentage of the sand and finer particles of the gravel drops through the gratings each time, whereas the stream of water flowing from the hopper 7, together with that forced upward by the plungers, carries forward the coarser gravel from the first bed and deposits it on the second bed, and from the second bed delivers it on the third bed. When the correct depth of bed is formed on the screen 11, the slide 24 is raised to such an extent as to allow sufficient material to escape through the channel 21 to maintain the bed, under the then condition of pump, at the same level. Similarly, the thickness of the bed on the grating 12 in cell 2, and that of the bed on the grating 13 in cell 3, is regulated.

The material that drops through the grating 11 of the first cell, falls into the storage chamber 18 at the bottom of this cell, and is then allowed to build up until it forms a satisfactory water seal. The regulating slide 33 of this cell is then raised sufficiently to allow enough material to escape through channel 30 to maintain the remainder at its proper level, the adjustments of these slides being made at intervals until a proper balance is established.

The proper material beds having thus been established, the separating of the materials proceeds by forcing the water from pump chamber 4 upward through the combined materials in cell 1, raising the lignite faster and higher than the sand and gravel, the water being then allowed to drop on the upward stroke of the plunger and the sand and gravel allowed to drop on the screen 11, through which some of the sand and finer particles of the gravel pass, while at the same time the stream of water carries some of the coarser particles of the gravel forward into cell 2. The cycle of operation is continuously repeated in cell 1, and at the same time a like cycle is performed in cell 2, the lignite being forced to the top, some of the sand and finer particles of the gravel dropping to the bottom and through the screen 12 into the storage chamber, and some of the coarser gravel in cell 2 being concurrently carried forward and deposited in cell 3 by the stream of water, where a similar cycle of operation still further separates the materials. The further flow of water carries the remainder of the material from cell 3 to the overflow channel 8 of this cell. In this overflow channel, the horizontal diaphragm 10 causes the lignite, which is carried in suspension by the water, to waste away through the upper one of the discharge outlets, while the coarse gravel is carried off by the lower outlet 9 of the overflow channel.

Some of the gravel that falls on the screen 11, and is too coarse to go through the same, would ordinarily remain thereon and gradually build the bed up too high, and it is this material which is necessarily removed through the channel 21 from such bed, and which is necessarily so removed in order to maintain the proper level of the bed. Similarly, such gravel as fails to go through, and that remains on top of screen 12, and on the top of screen 13, is removed from these screens through the corresponding channels 22 and 23.

In accomplishing the most important object of my invention,—namely, the elimination of lignite from sand and gravel, while treating the combined materials at a greater capacity rate than is possible with any other separation process with which I am familiar, I have found it necessary to force wash water through the material beds, and to cause it to overflow therefrom, in such volume, and so rapidly, that there is no perceptible stratification of the heavier materials, such as occurs in, and, in fact, is a feature of, the various processes and forms of apparatus employed for other wash-separation operations. Such stratification would tend to interfere with the dislodgment of the lignite from the material beds, with the passage of the wash water therethrough with the required rapidity and in the required volume, and with the rapid separation of the combined sand and finer particles of the gravel from the coarser particles of the latter. Also, in my process the rates and volumes of surge flow and overflow are so great that the coarser particles of the gravel do not form a layer adjoining the grate, which would obstruct the passage of the sand and small gravel therethrough, but, on the contrary, the formation of such a layer is interfered with, due to the combined upward and lateral movement imparted by the water to the coarse gravel.

Having now fully described my invention, what I claim and desire to secure by Letters Patent in the United States is:—

1. A process of separating a relatively light material and two heavier materials, which consists in placing the combined materials upon a screening device, forcing wash water therethrough, supplying additional water from above said screening device and causing the water to waste away, the initial volume and head of said wash water being so great as to cause thorough agitation of such combined materials and oppose stratification of said two heavier materials, and the speed at which the water is wasted away being such as to impart concurrent lateral movement to said materials, whereby one of said heavier materials, and the finer particles of the other one thereof, pass together through said screening device, the coarser particles of the last-named material are advanced in the direction of waste-water flow, and said relatively light material is carried away in suspension by the waste water.

2. A process for separating a relatively light material and two heavier materials, which consists in placing the combined materials upon a screening device, forcing wash water therethrough, supplying additional water from above said screening device and causing the water to waste away, the volume and head of said wash water being so great as to cause thorough agitation of such combined materials and the speed at which the water is wasted away being such as to impart concurrent lateral movement to said materials, whereby one of said heavier materials, and the finer particles of the other one thereof, pass together through said screening device, the coarser particles of the last-named material are advanced in the direction of waste-water flow, and said relatively light material is carried away by the waste water.

In testimony whereof I have hereunto set my name.

JOSEPH W. REID.